United States Patent [19]
Tallo

[11] Patent Number: 6,154,820
[45] Date of Patent: Nov. 28, 2000

[54] ARRANGEMENT FOR STORING PROGRAM INSTRUCTIONS AND DATA IN A MEMORY DEVICE AND METHOD THEREFOR

[75] Inventor: Ken Tallo, Austin, Tex.

[73] Assignee: Advanced Micro Devices, Inc., Austin, Tex.

[21] Appl. No.: 08/886,190

[22] Filed: Jul. 1, 1997

[51] Int. Cl.$^7$ .................................................. G06F 13/00
[52] U.S. Cl. ............................ 711/167; 711/103; 713/503
[58] Field of Search ............................ 713/503; 711/103, 711/167, 125

[56] References Cited

U.S. PATENT DOCUMENTS

| | | |
|---|---|---|
| 3,701,120 | 10/1972 | Charters et al. . |
| 3,701,979 | 10/1972 | Smith et al. . |
| 4,654,781 | 3/1987 | Schwartz et al. . |
| 5,282,174 | 1/1994 | Little .................................. 365/230.05 |
| 5,491,657 | 2/1996 | Haddad et al. ...................... 365/185.27 |
| 5,517,214 | 5/1996 | Adachi et al. ........................... 348/231 |
| 5,542,081 | 7/1996 | Geronimi .................................. 712/37 |
| 5,617,357 | 4/1997 | Haddad et al. ..................... 365/185.27 |

OTHER PUBLICATIONS

"Eight–Bit 80C51 Embedded Processors", 1990 Data Book, 4 pgs., © 1989 Advanced Micro Devices.

"Am29LV400T/Am29LV400B, 4 Megabit CMOS 3.0 Volt–only Sector Architecture Flash Memory" Brochure, (pp. 2–42); Advanced Micro Devices, May, 1997.

"AAm79C432 ISM PhoX ™ Controller for Cordless Digital Telephones" AMD Technical Manual, 87 pgs., © 1996 Advanced Micro Devices, Inc.

*Primary Examiner*—Hiep T Nguyen
*Attorney, Agent, or Firm*—Williams, Morgan & Amerson, P.C.

[57] ABSTRACT

A system stores program instructions and other data in a single memory device, such as a flash ROM, by adjusting a processing speed of a microcontroller during write operations. Adjusting the processing speed renders the time involved in writing to the memory device shorter than the fetch time. This allows the microcontroller to write data to the memory device and execute instructions stored on the same memory device.

25 Claims, 3 Drawing Sheets

ARRANGEMENT FOR STORING PROGRAM INSTRUCTIONS AND DATA IN A MEMORY DEVICE AND METHOD THEREFOR

TECHNICAL FIELD OF THE INVENTION

The present invention relates to data processing systems. More particularly, the invention relates to data processing systems for controlling the operation of microcontrollers.

BACKGROUND OF THE INVENTION

Developers of microcontroller systems often choose to store either executable instructions or data in nonvolatile memory devices that retain data even in the loss of power. Frequently, it is desirable that the memory space be writable as well as nonvolatile. One type of memory device, known as EEPROMs, is used in such application environments. This type of memory device typically stores data by charging or discharging voltages over a period of time and, consequently, introduce delay. Accordingly, an associated charge or discharge time limits the speed with which an EEPROM may be programmed. Reading data from such memory device types does not require such charging or discharging and therefore does not introduce significant delays, as with writing. This difference between read and write times imposes potentially significant design constraints.

Referring again to the specific example of an EEPROM device for illustration purposes, it is difficult for a single EEPROM device to store both executable instructions and data. This difficulty is a result of the prolonged write times. Because write times are longer than microcontroller instruction read (or fetch) times, a microcontroller arranged to use a single EEPROM to contain both executable instructions and data will attempt to fetch an instruction for execution prior to the expiration of a previous write cycle. With the previous write cycle still active, the microcontroller cannot fetch an instruction and is rendered inoperative.

In order to accommodate constraints of this type, many systems store executable instructions and data using separate memory devices. The use of separate memory devices, however, adds to the overall device size and cost of the system. Also, the use of an additional memory device introduces an additional component that can fail, reducing the overall reliability of the system. Furthermore, the additional power involved in operating extra memory devices presents a significant disadvantage in low-power applications, such as battery-powered systems, and generates additional heat and electrical noise. Moreover, solving the problem of prolonged write times by separately storing executable instructions and data fails to address the difficulties involved with writing the program memory. The program space remains inaccessible to the microcontroller, preventing the contents of the program memory from being altered dynamically. Hence, the execution of self-modifying programs is hindered.

SUMMARY OF THE INVENTION

Generally, the present invention provides methods and arrangements for storing executable instructions and other data in a memory. In one particular embodiment of the present invention, a microcontroller is configured and arranged to store the executable instructions and the other data in the memory using control signals. The microcontroller selectively adjusts a processing speed as a function of whether a storing mode of the microcontroller is active. A control arrangement is responsive to the microcontroller and is configured and arranged to modify the control signals for accessing the memory.

In another embodiment of the present invention, a data processing arrangement for storing executable instructions and other data in one memory includes a memory. The memory is responsive to control signals and is configured and arranged to store executable instructions and other data. A microcontroller is operatively coupled to the memory and is configured and arranged to selectively reduce a processing speed for storing the executable instructions and the other data in the memory. A control arrangement is responsive to the microcontroller and is configured and arranged to modify the control signals for accessing the memory for retrieving and storing the other data and for retrieving the program instructions.

According to another embodiment of the present invention, the exchange of executable instructions and other data with one memory device is accomplished using a data processing method. The method includes detecting a desired operational mode of the memory. If the desired operational mode is a storage mode, a processing speed of a microcontroller is adjusted. The microcontroller is used to selectively store or retrieve at least one of the executable instructions and the other data using the memory device. This method may be performed, for example, by a data processing arrangement or a microcontroller arrangement.

The above summary of the invention is not intended to describe each disclosed embodiment of the present invention. This is the purpose of the figures and of the detailed description that follows.

BRIEF DESCRIPTION OF DRAWINGS

Other aspects and advantages of the present invention will become apparent upon reading the following detailed description and upon reference to the drawings in which.

Figure 1:
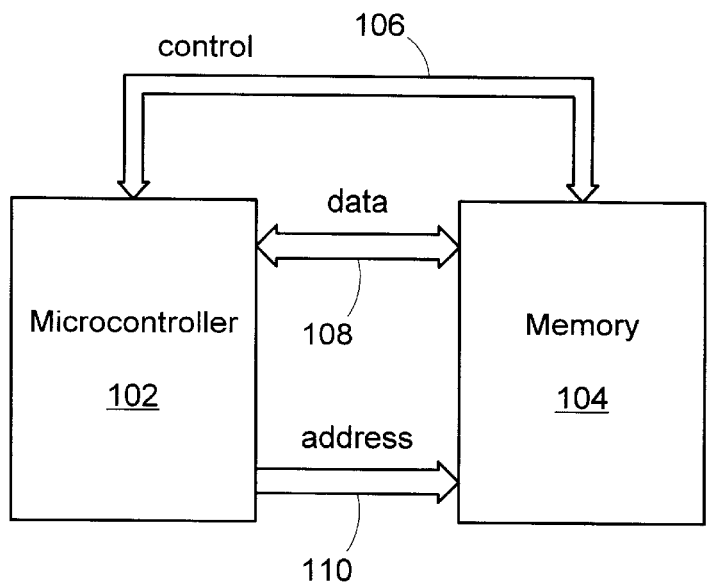
FIG. 1 is a block diagram of an example system according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DESCRIPTION OF VARIOUS EMBODIMENTS

The present invention relates to data processing systems having variable processing speeds. This invention is particularly advantageous in application environments in which a microcontroller is to read from and write to a single memory device, such as a flash ROM, that has a write time that exceeds the read time. Enabling a microcontroller to read from and write to a single memory device facilitates storing executable instructions and data. Furthermore, programs stored in this manner can be designed to modify themselves.

FIG. 1 illustrates an example system according to an embodiment of the present invention. In the illustrated embodiment, a processor 102 and a memory 104 are coupled by transmission paths 110 for addressing the memory 104. Additional transmission paths 108 allow the processor 102 to read data from and write data to the memory 104. Also, the processor 102 uses transmission paths 106 for controlling the memory 104. The precise arrangement of the transmission paths depends upon the choice of processor and memory device. Furthermore, additional circuitry optionally modifies the data, address, and/or control signals to ensure proper operation of the system.

In order for the processor 102 to read and write from a single memory device 104, the memory device 104 is configured and arranged to supply the processor 102 with the next executable instruction when the processor 102 attempts to fetch it. The time involved in fetching an instruction can be adjusted based on an operational mode, e.g., reading or writing, of the memory 104. Specifically, when the memory 210 enters a write state, the processor fetch time is lengthened to exceed the write time. This ensures that the processor will fetch the next executable instruction only after the previous write cycle has expired. The fetch time is shortened to its original length when the memory device is no longer in a write state.

Figure 2:
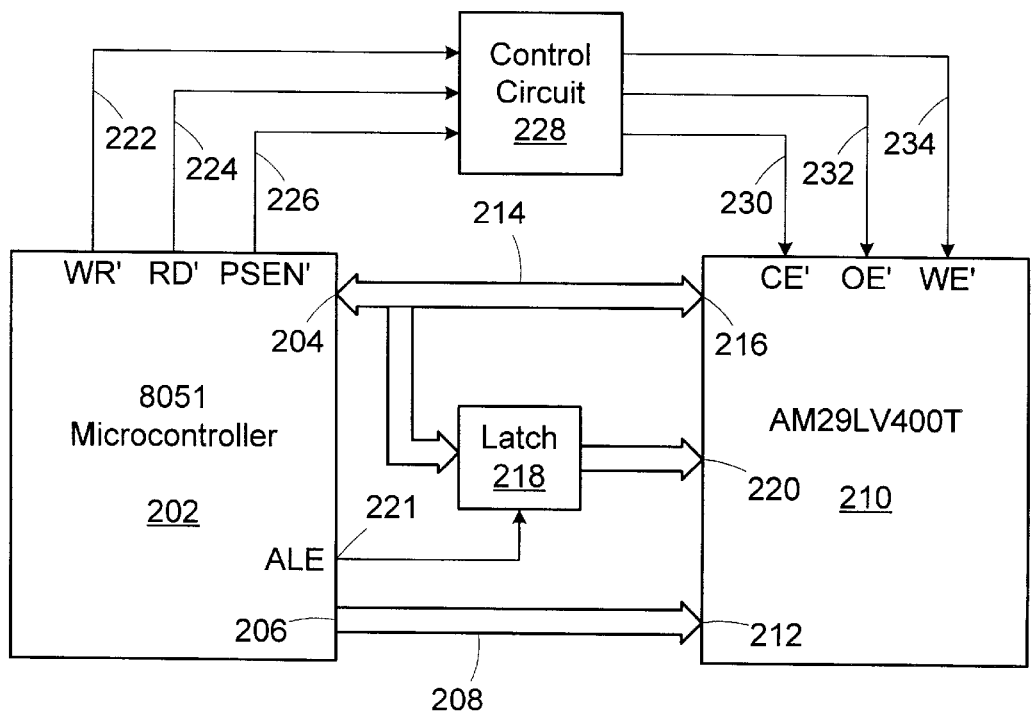
FIG. 2 is a block diagram of an example system according to another embodiment of the present invention.

FIG. 2 illustrates an alternative embodiment of the invention. In FIG. 2, a processor 202 is implemented using, for example, an 8051 microcontroller, commercially available from Intel Corp. The processor 202 includes two input/output (I/O) ports 204 and 206. A bus 208 connects the I/O port 206 to a set of high-byte address pins 212 on a memory 210. The memory 210 is implemented using, for example, an AM29LV400T-type flash ROM, commercially available from Advanced Micro Devices. A low-order address byte is multiplexed with data on the I/O port 204 using a data bus 214 that provides the data to a data port 216 and a latch 218 that, in turn, provides the data to data inputs 220 of the memory 210. An enable signal 221 activates the latch for storing data. The latch 218 is used to hold the low-order address byte on the data inputs 220 while data is being transmitted to the data port 216.

The processor 202 provides outputs to a control circuit 228 for controlling the memory 210. A write strobe (WR') output 222 provides a write enable signal for enabling a write operation of the memory 210. Similarly, a read strobe (RD') output 224 provides a read enable signal for enabling a read operation of the memory 210. A program store enable (PSEN') signal provides a read enable signal for fetching an executable instruction from memory 210.

The control circuit 228 supplies outputs that control the memory 210. A chip enable (CE') output 230 activates the memory 210, waking it from a low-power standby mode. An output enable (OE') output 232 activates the data port 216 for output during read cycles. Also, a write enable (WE') output activates the data port 216 for input during write cycles. In general, the control circuit ensures that the memory device 210 is in a mode of operation that corresponds to the current operation mode of the processor 202. Specifically, the outputs are as follows:

WE'=WR';
CE'=WR' ∪ RD' ∪ PSEN'; and
OE'=RD' ∪ PSEN'.

Figure 3:
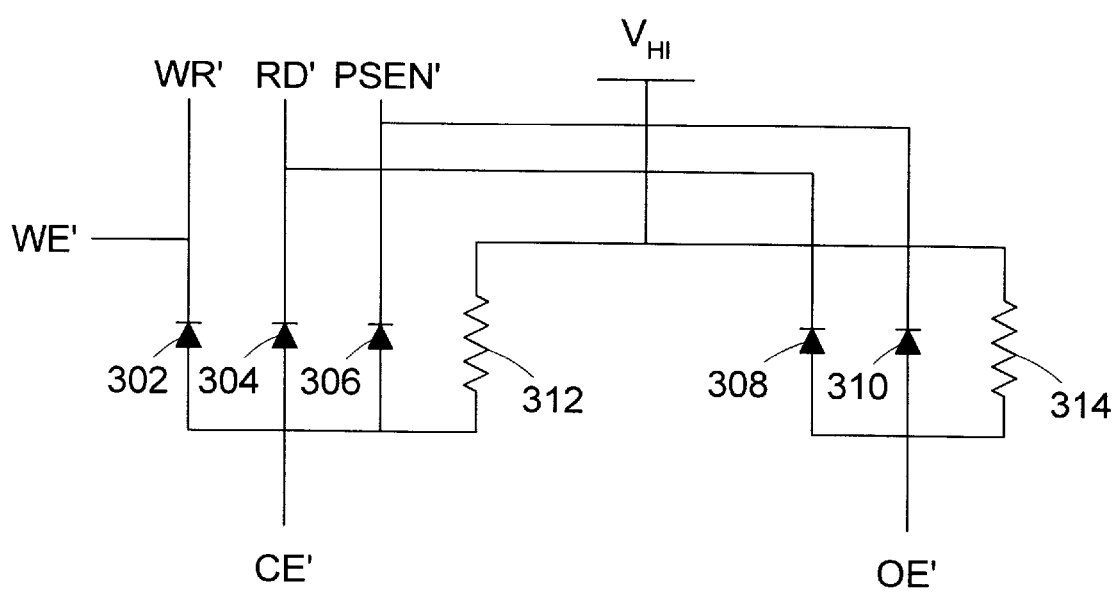
FIG. 3 is a schematic diagram of an example arrangement that can be used to implement part of the system of FIG. 2, according to an embodiment of the present invention.

FIG. 3 represents one example circuit that can be used to perform the logic operations described above. The diodes 302, 304, 306, 308, 310 in FIG. 3 are oriented with their n-regions towards their inputs. Their p-regions are connected, and tied high by pull-up resistors 312, 314. Inputs and outputs assert low. With the diodes 302, 304, 306, 308, and 310 arranged in this manner, asserting any of the inputs causes the respective output to assert. For example, asserting WR', RD' or PSEN' causes CE' to assert. Likewise, if RD' or PSEN' is asserted, OE' asserts. The external data memory write strobe (WR') pin is tied directly to the write enable (WE') pin. Thus, the circuit arrangement illustrated in FIG. 3 performs the above-described logic operations. It should be understood, however, that other circuit arrangements can be used to perform the operations.

Returning to FIG. 2, in order for the processor 202 to read from and write to a single memory device 210, the memory device 210 is configured and arranged to supply the processor 202 with the next executable instruction when the processor 202 attempts to fetch it. In particular, when the memory 210 enters a write state, the processor fetch time is lengthened to exceed the write time. This ensures that the processor 202 will fetch the next executable instruction only after the previous write cycle has expired. The fetch time is shortened to its original length when the memory device is no longer in the write state.

Dynamic alteration of fetch times can be accomplished using any of a variety of techniques. For instance, the processor can be clocked by an external oscillator that switches its output between an external clock input on the processor and a clock dividing circuit that, in turn, is connected to the external clock input on the processor. The switch can be controlled by the external data memory write strobe. The output of the oscillator is connected through the switch to the external clock input when the external data memory write strobe is unasserted. Conversely, when the external data memory write strobe is asserted, the oscillator feeds its output to a clock divider that reduces the frequency of the oscillation and drives the external clock input of the processor at the reduced frequency.

Dynamic alteration of fetch times can also be achieved through software. For instance, in anticipation of each external memory write operation, the processor speed can be slowed by writing to a register which controls processor speed. Upon expiration of the external memory write cycle, the contents of the register can be restored, thereby causing the processor to operate at its original speed.

Figure 4:
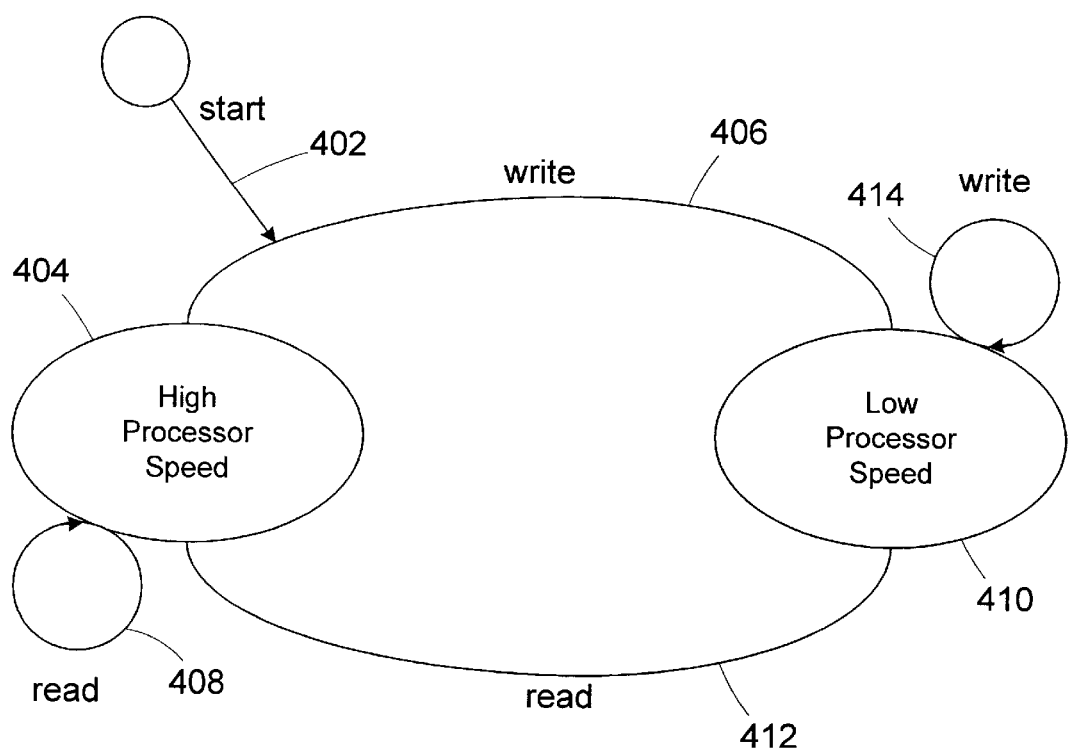
FIG. 4 is a diagram conceptually illustrating an example method according to still another embodiment of the present invention.

FIG. 4 conceptually illustrates an example data processing method according to another embodiment of the present invention. In the illustrated example method, as illustrated by a net 402, a system initially processes program instructions and data at a relatively high processing speed, as depicted at a block 404. As illustrated by a net 406, performing a write operation causes the system to assume a relatively low processing speed, as shown by a block 410. A read operation represented by a net 408, however, does not affect the processing speed. With the system remaining in the relatively high processing speed during read operations, system resources are utilized efficiently, and unnecessary slowing of the processor is avoided.

When the system is operating at the relatively low processing speed, performing a read operation causes the system to assume the relatively high processing speed, as depicted by a net 412. The system continues operating at the relatively low processing speed, however, when writing data to the memory, as illustrated by a net 414.

Maintaining operation at this speed allows the system to use a single memory to store both program instructions and other data. This results in a variety of advantages, including, for example, lower device size, cost, and power consumption. Decreasing the power consumption of the system in turn results in reduced generation of heat and electrical noise. In addition, storing both program instructions and other data on a single memory device facilitates the implementation of self-modifying programs.

The various embodiments described above are provided by way of illustration only and should not be construed to limit the invention. Those skilled in the art will readily recognize various modifications and changes that may be made to the present invention without strictly following the example embodiments and applications illustrated and described herein, and without departing from the true spirit and scope of the present invention, which is set forth in the following claims.

What is claimed is:

1. A data processing arrangement for storing executable instructions and other data in a memory, comprising:
    a microcontroller configured and arranged to store the executable instructions and the other data in the memory using control signals and to selectively and dynamically adjust a processing speed as a function of whether a mode of the microcontroller is a storing mode or a retrieving mode; and
    a control arrangement responsive to the microcontroller and configured and arranged to modify the control signals for accessing the memory at the selectively adjusted processing speed.

2. A data processing arrangement, according to claim 1, wherein the microcontroller is further configured and arranged to selectively reduce the processing speed in response to the storing mode.

3. A data processing arrangement, according to claim 1, wherein the microcontroller is further configured and arranged to operate at a first processing speed for retrieving the executable instructions and the other data from the memory and to operate at a second processing speed, lower than the first processing speed, for storing the executable instructions and the other data in the memory.

4. A data processing arrangement, according to claim 3, wherein the microcontroller is configured and arranged to resume operating at the first processing speed when the mode returns to the retrieving mode.

5. A data processing arrangement, according to claim 1, wherein the control arrangement is configured and arranged to modify the control signals for accessing the memory for retrieving and storing the other data and for retrieving the program instructions.

6. A data processing arrangement, according to claim 1, wherein the microcontroller is further configured and arranged to adjust the processing speed by executing at least one instruction.

7. A data processing arrangement, according to claim 1, wherein the microcontroller is further configured and arranged to selectively receive a divided clock signal.

8. A data processing arrangement for storing executable instructions and other data in one memory, comprising:
    a memory responsive to control signals and configured and arranged to store executable instructions and other data;
    a microcontroller operatively coupled to the memory and configured and arranged to selectively and dynamically reduce a processing speed for storing the executable instructions and the other data in the memory, and to selectively increase the processing speed in response to a storing mode becoming inactive; and
    a control arrangement responsive to the microcontroller and configured and arranged to modify the control signals for accessing the memory to retrieve and store the other data and to retrieve the program instruction.

9. A data processing arrangement, according to claim 8, wherein the control signals comprise at least one of a read enable, a write enable, and an instruction storage enable signal.

10. A data processing arrangement, according to claim 9, wherein the control arrangement is configured and arranged to generate an output enable signal using the read enable and instruction storage enable signals.

11. A data processing arrangement, according to claim 9, wherein the control arrangement is configured and arranged to selectively enable the memory using the write enable, read enable, and instruction storage enable signals.

12. A data processing arrangement, according to claim 8, wherein the microcontroller is further configured and arranged to adjust the processing speed by executing at least one instruction.

13. A data processing arrangement, according to claim 8, wherein the microcontroller is further configured and arranged to selectively receive a divided clock signal.

14. For exchanging executable instructions and other data with one memory device, a data processing method, comprising:
    detecting a desired operational mode of the memory;
    in response to the desired operational mode being a storage mode, dynamically adjusting a processing speed of a microcontroller;
    using the microcontroller to selectively store or retrieve at least one of the executable instructions and the other data using the memory device; and
    generating control signals for accessing the memory at a rate corresponding to the adjusted processing speed of the microcontroller.

15. A data processing method, according to claim 14, further comprising, in response to the desired operational mode being a storage mode, reducing the processing speed.

16. A data processing method, according to claim 14, further comprising, in response to the desired operational mode being a retrieval mode, increasing the processing speed.

17. A data processing method, according to claim 14, wherein the processing speed is adjusted to a first processing speed when the executable instructions and other data is stored, and is adjusted to a second processing speed when the executable instructions and other data is retrieved.

18. A data processing method, according to claim 15, further comprising modifying the control signals for retrieving and storing the other data and for retrieving the program instructions.

19. A data processing method, according to claim 15, wherein the control signals comprise at least one of a read enable, a write enable, and an instruction storage enable signal.

20. A data processing method, according to claim 19, further comprising generating an output enable signal using the read enable and instruction storage enable signals.

21. A data processing method, according to claim 19, further comprising selectively enabling the memory using the write enable, read enable, and instruction storage enable signals.

22. A data processing method according to claim 14, further comprising adjusting the processing speed by executing at least one instruction.

23. A data processing method according to claim 14, further comprising adjusting the processor speed using a divided clock signal.

24. A data processing arrangement for storing executable instructions and other data in a memory, comprising:

means for detecting a desired operational mode of the memory;

means for, in response to the desired operational mode being a storage mode, dynamically adjusting a processing speed of a microcontroller;

means for using the microcontroller to selectively store or retrieve at least one of the executable instructions and the other data using the memory device; and means for generating control signals for accessing the memory at a rate corresponding to the adjusted processing speed of the microcontroller.

25. A microcontroller arrangement for storing executable instructions and other data in a memory, configured and arranged to:

detect a desired operational mode of the memory;

in response to the desired operational mode being a storage mode, adjusting a processing speed to a first processing speed;

in response to the desired operational mode being a retrieval mode, adjusting the processing speed to a second processing speed different than the first processing speed; and selectively store or retrieve at least one of the executable instructions and the other data to or from the memory device at the first or second processing speed respectively.

* * * * *